United States Patent
Sundaresan et al.

(10) Patent No.: US 7,324,517 B1
(45) Date of Patent: Jan. 29, 2008

(54) CONVERTING DATA PACKETS IN A COMMUNICATION NETWORK

(75) Inventors: Krishna Sundaresan, Sunnyvale, CA (US); Barry J. Schween, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 1002 days.

(21) Appl. No.: 10/417,430

(22) Filed: Apr. 16, 2003

(51) Int. Cl.
*H04L 12/56* (2006.01)
(52) U.S. Cl. ...................................... 370/392; 370/389
(58) Field of Classification Search ................ 370/389, 370/386, 392, 411, 395.1, 395.21, 395.31, 370/395.4, 395.42, 395.43, 395.5, 395.52, 370/401, 402, 395.3
See application file for complete search history.

(56) References Cited

U.S. PATENT DOCUMENTS

| | | | |
|---|---|---|---|
| 6,084,892 A | 7/2000 | Benash et al. | 370/701 |
| 6,356,546 B1 | 3/2002 | Beshai | 370/358 |
| 6,480,898 B1 | 11/2002 | Scott et al. | 709/238 |
| 6,487,217 B1 | 11/2002 | Baroudi | 370/466 |
| 6,522,667 B1* | 2/2003 | Oda et al. | 370/474 |
| 2003/0043809 A1* | 3/2003 | Kawakami et al. | 370/395.1 |

* cited by examiner

*Primary Examiner*—Brenda Pham
(74) *Attorney, Agent, or Firm*—Baker Botts L.L.P.

(57) ABSTRACT

Converting a data packet involves receiving a first data packet. The first data packet has a first header expressed according to a first protocol, where the first header has a first source address and a first destination address. A second header corresponding to the first header is generated. The second header is expressed according to an Internet Protocol, and has a second source address and a second destination address. The second source address corresponds to the first source address, and the second destination address corresponds to the first destination address. The first data packet is converted to a second data packet by replacing the first header with the second header. The second data packet comprising the second header is outputted.

20 Claims, 2 Drawing Sheets

CONVERTING DATA PACKETS IN A COMMUNICATION NETWORK

TECHNICAL FIELD OF THE INVENTION

This invention relates generally to the field of telecommunications and more specifically to converting data packets in a communication network.

BACKGROUND OF THE INVENTION

A communication network may use more than one communication protocol to communicate a data packet from a source to a destination. For example, when upgrading a communication protocol used by a communication network, some portions of the communication network may operate according to the old communication protocol, where other portions may communicate according to the new communication protocol. In such cases, a data packet is typically converted from one communication protocol to the other communication protocol as the data packet travels through the communication network. Known techniques for converting data packets, however, may be inefficient. Consequently, known techniques for converting data packets may be unsatisfactory in certain situations.

SUMMARY OF THE INVENTION

In accordance with the present invention, disadvantages and problems associated with previous techniques for converting data packets may be reduced or eliminated.

According to one embodiment of the present invention, converting a data packet involves receiving a first data packet. The first data packet has a first header expressed according to a first protocol, where the first header has a first source address and a first destination address. A second header corresponding to the first header is generated. The second header is expressed according to an Internet Protocol, and has a second source address and a second destination address. The second source address corresponds to the first source address, and the second destination address corresponds to the first destination address. The first data packet is converted to a second data packet by replacing the first header with the second header. The second data packet comprising the second header is outputted.

Certain embodiments of the invention may provide one or more technical advantages. A technical advantage of one embodiment may be that a data packet may be converted by replacing the header expressed according to one communication protocol with a header expressed according to another communication protocol. Another technical advantage of one embodiment may be that the payload of multiple data packets may be placed in the converted data packet.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
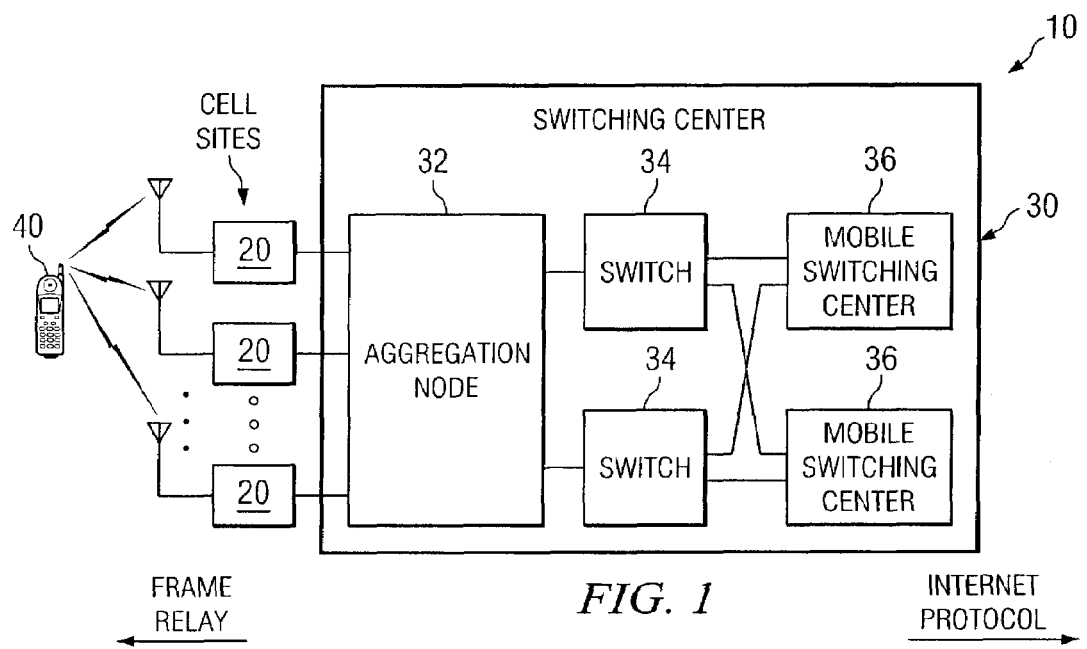
FIG. 1 is a block diagram of one embodiment of a communication network that may include a packet converter for converting data packets.
Figure 2:
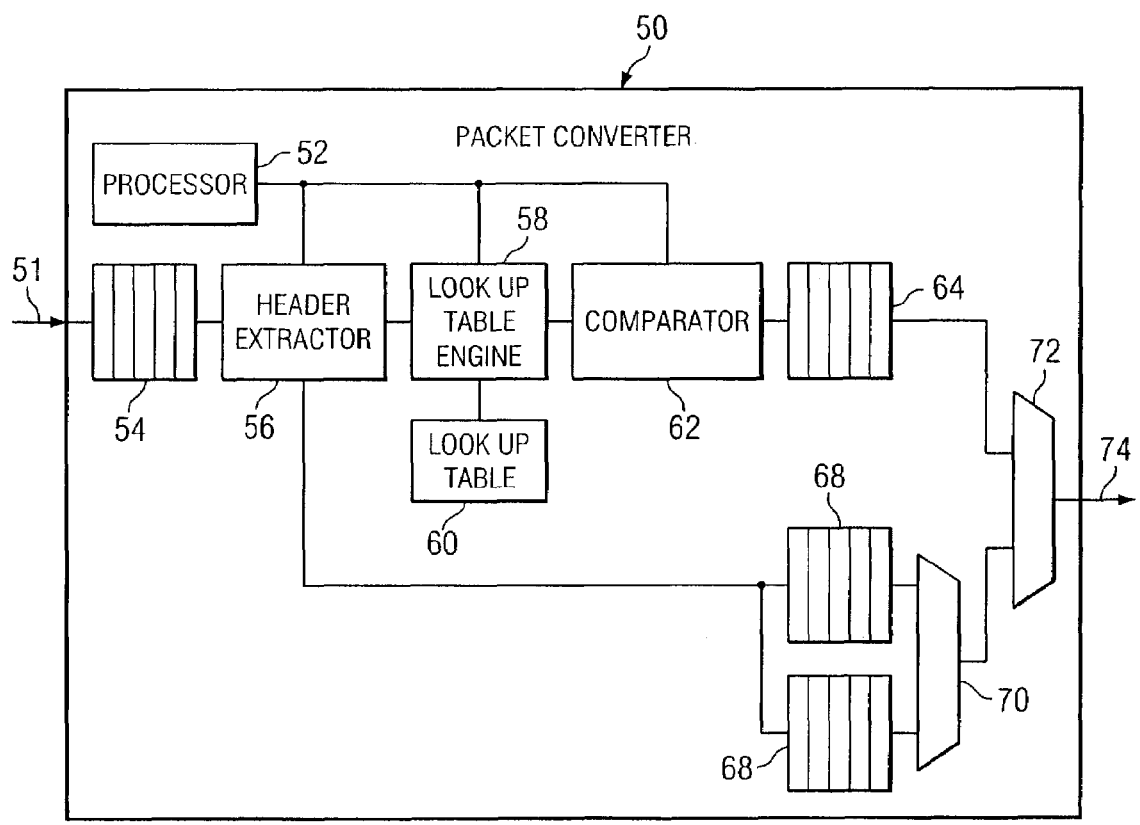
FIG. 2 is a block diagram of one embodiment of a packet converter for converting data packets.
Figure 3:
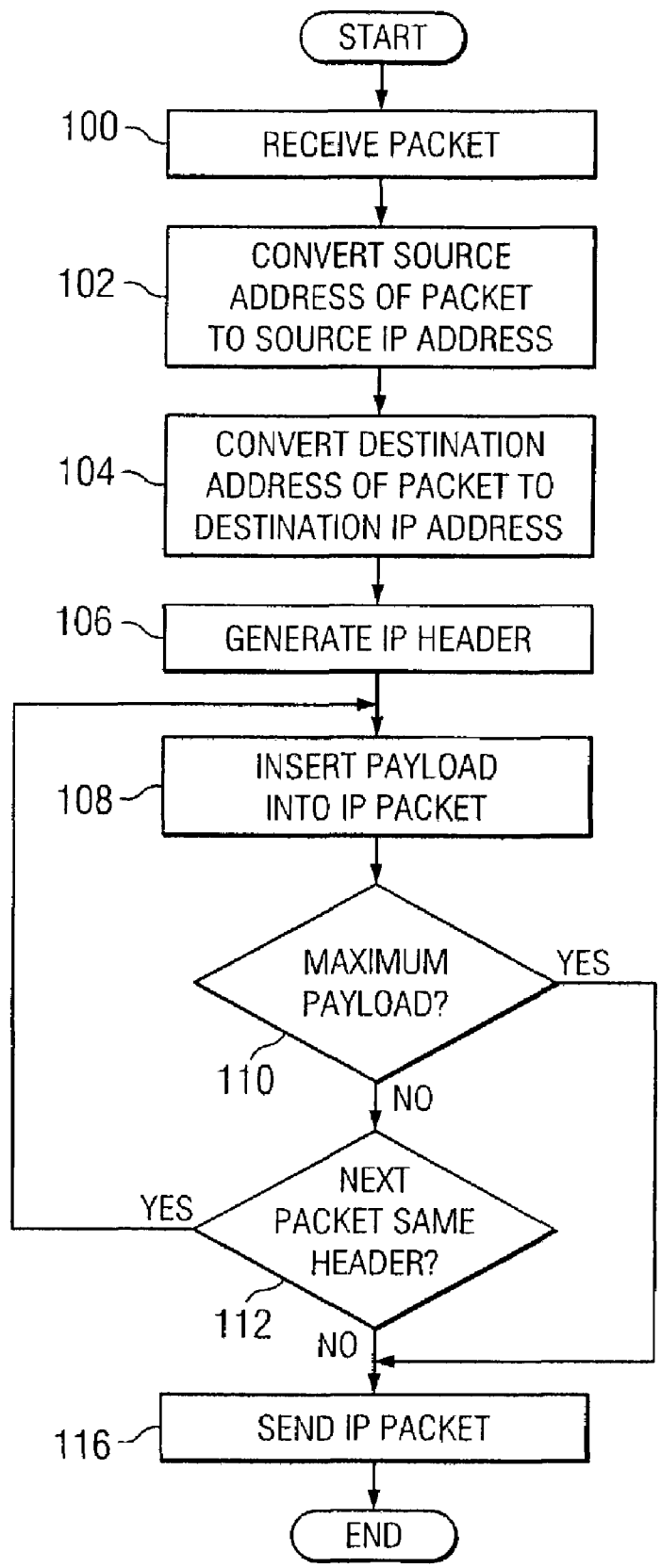
FIG. 3 is a flow chart illustrating one embodiment of a method for converting data packets.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a communication network 10 that includes a packet converter for converting data packets. The packet converter may be located at any node of communication network 10, and operates to convert data packets from one communication protocol to another communication protocol. Data packets are converted by replacing the header expressed according to one communication protocol with a header expressed according to the other communication protocol.

According to the illustrated embodiment, a communication device 40 uses services provided by communication network 10. Communication device 40 may comprise, for example, a personal digital assistant, a cellular telephone, a mobile handset, or any other device suitable for communicating data packets to and from communication network 10. Communication device 40 may support, for example, simple Internet Protocol (IP), mobile IP, or any other suitable communication protocol. Communication device 40 may utilize, for example, Global System for Mobile communications (GSM) technology or any other suitable mobile communication technology.

Communication network 10 allows communication device 40 to communicate with other networks or devices. Communication network 10 may comprise a public switched telephone network (PSTN), a public or private data network, the Internet, a wireline or wireless network, a local, regional, or global communication network, an enterprise intranet, other suitable communication link, or any combination of the preceding.

Communication network 10 may communicate data packets comprising information such as data, video, multimedia, any other suitable type of information, or any combination of the preceding. The data packet comprises a header and a payload. The header includes information that is used to guide the data packet to its destination. The information may include, for example, a source address, a destination address, a quality of service value, a checksum value, a precedence level, routing instructions, and/or other information that may be used to route the data packet. The header is typically expressed according to a particular communication protocol. The payload comprises the information that is being processed or transported.

According to one embodiment, communication network 10 includes cell sites 20 and a switching center 30 that includes an aggregation node 32, switches 34, and mobile switching centers 36 coupled as shown in FIG. 1. A cell site 20 provides communication device 40 with access to communication network 10. Cell site 20 includes a base transceiver station and a base station controller. The base transceiver station communicates signals to and from communication device 40, and the base station controller manages the operation of the base transceiver station. The wireless link between communication device 40 and cell sites 20 is a radio frequency link that is cellular in network organization.

According to one embodiment, cell sites 20 use the Frame Relay (FR) protocol defined by the International Telecommunication Union Telecommunication Standardization Sector (ITU-T) in the I.122 recommendation. A Frame Relay data packet includes a native protocol data unit encapsulated in a frame that comprises header and trailer information. The header comprises a flag denoting the beginning of the frame and an address field used for routing the frame. The trailer includes a frame check sequence for detection and correction of errors in the address field and an ending flag denoting the end of the frame. Frame Relay is a connection-oriented protocol. Transmission of frames between user sites is generally on the basis of Permanent Virtual Circuits (PVCs), which are pre-determined paths specifically designed in the Frame Relay routing logic. Frames transmitted between any two user sites follow the same PVC path such that frames do not arrive out of sequence.

Switching center 30 receives data packets from cell sites 20 and routes the data packets according to the destination specified in the header of the data packets. Switching center 30 also receives data packets from elsewhere in the communication network 10 and routes the data packets to the appropriate cell sites 20 according to the destination specified in the packet header.

Aggregation node 32 of switching center 30 aggregates data packets received from cell sites 20, and routes the data packets to the appropriate switch 34 or mobile switching center 36. Switches 34 may comprise asynchronous transfer mode (ATM) switches. ATM switches forwards packets comprising ATM-standard cells between different devices. Mobile switching centers 36 coordinate data packets and may be configured to process specific kinds of data packets. For example, specific mobile switching centers 36 may be configured to process voice communications, data communications, or other type of communications. Switch 34 may route the data packets according to the mobile switching center 36 operable to process the data packets. A multipurpose switch such as the MGX-8800 provided by CISCO SYSTEMS, INC. may be used to perform one or more operations at switching center 30.

All or a portion of switching center 30 may use the Internet Protocol. The Internet Protocol is used to track the Internet address of nodes, route outgoing messages, and recognize incoming messages. An Internet Protocol data packet comprises a datagram that includes a source address, a destination address, data, and additional information such as the length of the datagram and a header checksum.

According to one embodiment, communication network 10 may use one or more communication protocols. For example, cell sites 20 may use the Frame Relay protocol, while switching center 30 may use the Internet Protocol. A packet converter may be used to convert data packets from one communication protocol to another communication protocol, and vice versa. The packet converter may be located at any suitable node of communication network 10 between devices that use different communication protocols. For example, the packet converter may be placed at an access router or other cell site router located at cell site 20. As another example, the packet converter may be placed at switching center 30 such as at aggregation node 32, between aggregation node 32 and switch 34, or between switch 34 and mobile switching center 36. The packet converter may be used during the migration of communication network 10 if, for example, elements of switching center 30 are converted to the Internet Protocol before cell sites 20 are converted.

The packet converter may convert between any two suitable communication protocols. For example, the packet converter may convert between the Frame Relay protocol and the Internet Protocol, between an Asynchronous Transfer Mode protocol and the Internet Protocol, or between a Time Division Multiplex (TDM) protocol and the Internet Protocol.

Modifications, additions, or omissions may be made to communication network 10 without departing from the scope of the invention. For example, switches 34 may comprise another type of switch such as a Catalyst 6500 Switch provided by CISCO SYSTEMS, INC. Moreover, the operation of communication network 10 may be performed by more or fewer modules. For example, the operation of mobile switching centers 36 may be performed by one module, or the operation of aggregation node 32 may be performed by more than one module. Additionally, functions may be performed using any suitable logic comprising software, hardware, other logic, or any suitable combination of the preceding. As used in this document, "each" refers to each member of a set or each member of a subset of a set.

FIG. 2 is a block diagram of one embodiment of a packet converter 50 that converts data packets. Packet converter 50 operates to convert data packets from one communication protocol to another communication protocol by replacing the header expressed using one communication protocol with a header expressed using the other communication protocol. Packet converter 50 may also insert multiple payloads into the converted data packet.

According to the illustrated embodiment, packet converter 50 includes an input 51, a processor 52, a buffer 54, a header extractor 56, a lookup table engine 58, a lookup table 60, a comparator 62, a header buffer 64, one or more payload buffers 68, multiplexers 70 and 72, and an output 74 coupled as shown in FIG. 2.

In operation, a data packet with a header expressed according to a communication protocol is received at buffer 54. Header extractor 56 sends the header to lookup table engine 58 and the payload to payload buffer 68. Lookup table engine 58 converts the header to another communication protocol. The converted header is stored at header buffer 64. If a next data packet is received, comparator 62 compares the header of the next data packet with the header at header buffer 64. If the headers are substantially similar, the payloads of the data packets with the substantially similar headers are inserted into the same resulting converted data packet.

According to one embodiment, input 51 receives data packets, and buffer 54 stores the received data packets. Processor 52 controls the operation of packet converter 50, and may comprise any device operable to accept input, process the input according to specified rules, and produce output. Header extractor 56 extracts the header from a received data packet. Lookup table engine 58 accesses lookup table 60 in order to translate the header from one communication protocol to another communication protocol. Examples of lookup table 60 are described with reference to TABLES 1 through 3.

TABLE 1 illustrates an example of a lookup table 60 that may be used to convert between Frame Relay headers and Internet Protocol headers. TABLE 1 is shown for illustration purposes only. Other suitable tables having different fields and values may be used.

TABLE 1

| DLCI | IP Addresses | Quality of Service | Packing Information |
|---|---|---|---|
| 101 | 192.10.20.100 | 010 | 2 |
| 201 | 192.11.30.101 | 001 | 3 |

The source address and destination address of a Frame Relay frame is expressed by the data link connection identifier (DLCI). The data link connection identifier identifies the data link and associated service parameters such as frame size, committed information rate (CIR), committed burst size (Bc), burst excess size (Be), and committed rate measurement interval (Tc).

TABLE 1 lists the data link connection identifiers of data packets received from cell sites 20, and provides corresponding IP addresses, quality of service values, and packing information. The IP address includes the source IP address and the destination IP address that correspond to the source and destination addresses, respectively, specified in the data link connection identifier. The quality of service value corresponds to the quality of service value of the data link connection identifier. Packing information indicates the number of payloads of Frame Relay frames that may be inserted into an IP data packet.

TABLE 2 illustrates an example of a lookup table 60 that may be used to convert between Asynchronous Transferred Mode headers and Internet Protocol headers. TABLE 2 is shown for illustration purposes only. Other suitable tables having different fields and values may be used.

TABLE 2

| VPI/VCI | IP Addresses | Quality of Service | Packing Information |
|---|---|---|---|
| 5/51 | 178.10.20.50 | 101 | 3 |

An Asynchronous Transfer Mode header includes a virtual path identifier (VPI) and a virtual channel identifier (VCI). The virtual path identifier indicates the virtual path over which a cell should be routed. The virtual channel identifier comprises a virtual channel over which a stream of cells travels between devices during the course of a session. For each virtual path identifier and virtual channel identifier combination, TABLE 2 provides a corresponding IP address, quality of service value, and packing information.

TABLE 3 illustrates an example of a lookup table 60 that may be used to convert between Time Division Multiplex headers and Internet Protocol headers. TABLE 3 is shown for illustration purposes only. Other suitable tables having different fields and values may be used.

TABLE 3

| Time Slot | IP addresses | Quality of Service | Packing Information |
|---|---|---|---|
| 3 | 178.10.30.52 | 100 | 1 |

A time slot is committed to transporting certain data packets. For each time slot of data packets received from cell sites 20, TABLE 3 provides a corresponding IP address, quality of service value, and packing information.

Referring back to FIG. 3, comparator 62 compares the header of a data packet stored at packet buffer 64 with the header of a next data packet. Payload buffers 68 store the payloads of the data packets. Multiplexer 70 multiplexes the payloads stored at payload buffers 68. Multiplexer 72 multiplexes one or more payloads received from multiplexer 70 with the header stored at header buffer 64. Output 74 outputs the resulting converted data packet.

Packet converter 50 may provide for more efficient data packet conversion by discarding the original header and replacing the original header with the new header. Other techniques for converting data packets do not discard the original header, which may take up additional space.

Packet converter 50 may be configured such that data packets are converted according to permanent virtual connections. Some of the data packets may be directed through switch 34 comprising an ATM switch, and other data packets may be directed through gigabyte Ethernet interfaces. This may allow service providers to use mobile switching centers 36 with gigabyte Ethernet interfaces and with Asynchronous Transfer Mode interfaces.

Modifications, additions, or omissions may be made to the system without departing from the scope of the invention. Moreover, the operation of the system may be performed by more or fewer modules. For example, the operation of header extractor 56 and lookup table engine 58 may be performed by one module, or the operation of lookup table engine 58 may be performed by more than one module. Additionally, functions may be performed using any suitable logic comprising software, hardware, other logic, or any suitable combination of the preceding.

FIG. 3 is a flowchart illustrating one embodiment of a method for converting data packets. The method begins at step 100, where packet converter 50 receives a data packet. Lookup table engine 58 of packet converter 50 converts the source address of the data packet to a source IP address at step 102. The destination address of the data packet is converted to the destination IP address at step 104. Lookup table engine 58 generates an IP header at step 106 from the source IP address and the destination IP address.

The payload of the data packet is inserted into an IP data packet at step 108. Payloads up to a maximum payload may be inserted into the IP data packet. If a maximum payload has not been reached at step 110, the method proceeds to step 112. If the next data packet has the same header as the header of the current data packet at step 112, the method returns to step 108 to insert the payload of the next data packet into the IP data packet. If a maximum payload has been reached at step 110, or if the next data packet does not have the same header at step 112, the method proceeds to step 116. The IP data packet is sent at step 116. After sending the IP data packet, the method terminates.

Modifications, additions, or omissions may be made to the method without departing from the scope of the invention. Additionally, steps may be performed in any suitable order without departing from the scope of the invention.

Certain embodiments of the invention may provide one or more technical advantages. A technical advantage of one embodiment may be that a data packet may be converted by replacing the header expressed according to one communication protocol with a header expressed according to another communication protocol. Another technical advantage of one embodiment may be that the payload of multiple data packets may be placed in the converted data packet.

Although an embodiment of the invention and its advantages are described in detail, a person skilled in the art could make various alterations, additions, and omissions without departing from the spirit and scope of the present invention as defined by the appended claims.

What is claimed is:

1. A method for converting a data packet, comprising:
receiving a first data packet at a packet converter, the first data packet comprising a first header expressed according to a first protocol comprising a Frame Relay Protocol, the first header comprising a first source address and a first destination address expressed by a data link connection identifier;
generating a second header corresponding to the first header, the second header expressed according to an Internet Protocol, the second header comprising a second source address and a second destination address, the second source address corresponding to the first source address, the second destination address corresponding to the first destination address;
converting the first data packet to a second data packet by replacing the first header with the second header; and
outputting the second data packet comprising the second header.

2. The method of claim 1, wherein generating the second header corresponding to the first header comprises:
accessing a lookup table;
determining the second source address corresponding to the first source address according to the lookup table; and
determining the second destination address corresponding to the first destination address according to the lookup table.

3. The method of claim 1, wherein:
receiving the first data packet at the packet converter further comprises receiving a plurality of first data packets at the packet converter, each first data packet comprising a first payload; and
converting the first data packet to the second data packet further comprises forming a second payload of the second data packet from the plurality of first payloads.

4. The method of claim 1, wherein:
receiving the first data packet at the packet converter further comprises receiving a plurality of first data packets, each first data packet comprising a first header and a first payload; and
converting the first data packet to the second data packet further comprises:
determining that the plurality of first headers are substantially similar; and
forming a second payload of the second data packet from the plurality of first payloads.

5. The method of claim 1, wherein:
the first header further comprises a first quality of service value; and
the second header further comprises a second quality of service value, the second quality of service value corresponding to the first quality of service value.

6. The method of claim 1, wherein the packet converter is located at a location selected from a group consisting of a cell site and a switching center.

7. A system for converting a data packet, comprising:
an input operates to receive a first data packet, the first data packet comprising a first header expressed according to a first protocol comprising a Frame Relay Protocol, the first header comprising a first source address and a first destination address expressed by a data link connection identifier; and
a processor coupled to the input and operates to:
generate a second header corresponding to the first header, the second header expressed according to an Internet Protocol, the second header comprising a second source address and a second destination address, the second source address corresponding to the first source address, the second destination address corresponding to the first destination address;
convert the first data packet to a second data packet by replacing the first header with the second header; and
output the second data packet comprising the second header.

8. The system of claim 7, wherein the processor further operates to generate the second header corresponding to the first header by:
accessing a lookup table;
determining the second source address corresponding to the first source address according to the lookup table; and
determining the second destination address corresponding to the first destination address according to the lookup table.

9. The system of claim 7, wherein the processor further operates to:
receive the first data packet at the packet converter further by receiving a plurality of first data packets at the packet converter, each first data packet comprising a first payload; and
convert the first data packet to the second data packet further by forming a second payload of the second data packet from the plurality of first payloads.

10. The system of claim 7, wherein the processor further operates to:
receive the first data packet at the packet converter further by receiving a plurality of first data packets, each first data packet comprising a first header and a first payload; and
convert the first data packet to the second data packet further by:
determining that the plurality of first headers are substantially similar; and
forming a second payload of the second data packet from the plurality of first payloads.

11. The system of claim 7, wherein:
the first header further comprises a first quality of service value; and
the second header further comprises a second quality of service value, the second quality of service value corresponding to the first quality of service value.

12. The system of claim 7, wherein the processor is located at a location selected from a group consisting of a cell site and a switching center.

13. Logic for converting a data packet, the logic embodied in a computer-readable storage medium and when executed by a computer, causing the computer to:
receive a first data packet at a packet converter, the first data packet comprising a first header expressed according to a first protocol comprising a Frame Relay Protocol, the first header comprising a first source address and a first destination address expressed by a data link connection identifier;
generate a second header corresponding to the first header, the second header expressed according to an Internet Protocol, the second header comprising a second source address and a second destination address, the second source address corresponding to the first source address, the second destination address corresponding to the first destination address;
convert the first data packet to a second data packet by replacing the first header with the second header; and output the second data packet comprising the second header.

14. The logic of claim 13, further operates to generate the second header corresponding to the first header by:
    accessing a lookup table;
    determining the second source address corresponding to the first source address according to the lookup table; and
    determining the second destination address corresponding to the first destination address according to the lookup table.

15. The logic of claim 13, further operates to:
    receive the first data packet at the packet converter by receiving a plurality of first data packets at the packet converter, each first data packet comprising a first payload; and
    convert the first data packet to the second data packet by forming a second payload of the second data packet from the plurality of first payloads.

16. The logic of claim 13, further operates to:
    receive the first data packet at the packet converter further by receiving a plurality of first data packets, each first data packet comprising a first header and a first payload; and
    convert the first data packet to the second data packet further by:
        determining that the plurality of first headers are substantially similar; and
        forming a second payload of the second data packet from the plurality of first payloads.

17. The logic of claim 13, wherein:
    the first header further comprises a first quality of service value; and
    the second header further comprises a second quality of service value, the second quality of service value corresponding to the first quality of service value.

18. The logic of claim 13, wherein the packet converter is located at a location selected from a group consisting of a cell site and a switching center.

19. A system for converting a data packet, comprising:
    means for receiving a first data packet at a packet converter, the first data packet comprising a first header expressed according to a first protocol comprising a Frame Relay Protocol, the first header comprising a first source address and a first destination address expressed by a data link connection identifier;
    means for generating a second header corresponding to the first header, the second header expressed according to an Internet Protocol, the second header comprising a second source address and a second destination address, the second source address corresponding to the first source address, the second destination address corresponding to the first destination address;
    means for converting the first data packet to a second data packet by replacing the first header with the second header; and
    means for outputting the second data packet comprising the second header.

20. A method for converting a data packet, comprising:
    receiving a plurality of first data packets at a packet converter, each first data packet comprising a first header and a first payload, the first header expressed according to a first protocol, the first header comprising a first source address and a first destination address expressed by a data link connection identifier, the first header further comprising a first quality of service value, the first protocol comprising a Frame Relay protocol, the packet converter located at a location selected from a group consisting of a cell site and a switching center;
    generating a second header corresponding to at least one first header, the second header expressed according to an Internet Protocol, the second header comprising a second source address and a second destination address, the second source address corresponding to the first source address, the second destination address corresponding to the first destination address, the second header generated by accessing a lookup table, by determining the second source address corresponding to the first source address according to the lookup table, and by determining the second destination address corresponding to the first destination address according to the lookup table, the second header further comprising a second quality of service value, the second quality of service value corresponding to the first quality of service value;
    converting the at least one first data packet to a second data packet by replacing the first header with the second header, by determining that the plurality of first headers are substantially similar, and by forming a second payload of the second data packet from the plurality of first payloads; and
    outputting the second data packet comprising the second header.

\* \* \* \* \*